United States Patent [19]

Lalwani et al.

[11] Patent Number: 4,851,500

[45] Date of Patent: Jul. 25, 1989

[54] PROCESS FOR PREPARING A RUBBER SCRAP COMPOSITION

[75] Inventors: Steven S. Lalwani, Upper Montclair; William G. Pursell, Sr., Woodbridge; Charles J. Horner, Jr., South Bound Brook, all of N.J.

[73] Assignee: GAF Corporation, Wayne, N.J.

[21] Appl. No.: 194,191

[22] Filed: May 16, 1988

[51] Int. Cl.$^4$ ............................................. C08L 17/00
[52] U.S. Cl. ................................. 528/487; 264/109; 525/197; 525/198; 525/212; 528/502; 521/41; 521/43; 521/45.5
[58] Field of Search .................. 521/41, 43, 45.5; 525/197, 198, 212; 528/487, 502; 264/109

[56] References Cited

U.S. PATENT DOCUMENTS 2,809,944 10/1957 Sverdrup ............................. 521/41
3,027,599 4/1962 Pluhacek et al. ..................... 521/41
4,101,463 7/1978 Morgan et al. ...................... 521/43

Primary Examiner—Allan M. Lieberman
Attorney, Agent, or Firm—Richard T. Laughlin; Anthony Lagani, Jr.; Joshua J. Ward

[57] ABSTRACT

A process and apparatus is provided for making a rubber-like product from rubber scrap, such as recycled tire scrap. The process includes mixing the rubber scrap with from 1 percent to 15 percent, with respect to the weight of the rubber scrap, of added sulphur, and applying a pressure thereto of about 1000 to 3000 pounds per square inch for 1 to 10 minutes at a temperature of from about 250 degrees F. to about 450 degrees F. In addition, 1 to 8 percent, with respect to the weight of the rubber scrap, of antioxidants and antiozonants are added to the mixture of rubber scrap and sulphur. The sulphur is free sulphur. Derivative sulphur compounds, or like vulcanizing agents, can be added in place of the free sulphur of about 1 to 45 percent of the weight of the rubber scrap. The rubber scrap is buffing of recycled tire rubber, or powder made from recycled tire rubber. An apparatus for carrying out the process is also provided. The apparatus includes a heavy duty mixer for making the mixture of the rubber scrap and sulphur and antioxidants and antiozonants. The apparatus also includes a compression molding and heating apparatus for applying the pressure and temperature to the mixture. The process is particularly suitable for making roofing products.

5 Claims, No Drawings

PROCESS FOR PREPARING A RUBBER SCRAP COMPOSITION

The invention generally relates to a rubber reclaiming process, and in particular the invention relates to a rubber reclaiming process to make a rubberlike product from recycled tire rubber.

BACKGROUND OF THE INVENTION

The prior art process for making a rubber-like product from recycled tire rubber, or rubber scrap, is described in U.S. Pat. No. 2,809,944, issued Oct. 15, 1957.

Related patents include U.S. Pat. Nos. 1,550,968, issued Aug. 25, 1925; 4,073,753, issued Feb. 14, 1978; 4,097,644, issued June 27, 1978; 4,250,222, issued Feb. 10, 1981; 4,506,034, issued Mar. 19, 1985 and Canadian Pat. No. 687,455, issued May 26, 1964.

The prior art process of producing a rubberlike product from rubber scrap includes mixing rubber scrap with from 2 percent to 20 percent with respect to the weight of the rubber scrap of added sulphur, and applying a working and plasticizing action at a temperature of from about 300 degrees F. to about 500 degrees F.

A problem with the prior art process is the difficulty in applying a working and plasticizing action by using a screw impeller plasticizer or the like.

SUMMARY OF THE INVENTION

According to the present invention, a process of producing a rubber-like product from rubber scrap is provided. This process includes mixing rubber scrap with from 1 percent to 15 percent with respect to the weight of the rubber scrap of added sulphur, and applying a pressure of about 1000 to 3000 pounds per square inch for 1 to 10 minutes at a temperature of from about 250 degrees F. to about 450 degrees F.

By using the step of applying a pressure of about 1000 to 3000 pounds per square inch for 1 to 10 minutes, one can use a compression molding device or the like, so that the need for applying a working and plasticizing action using a screw impeller or the like is avoided.

The foregoing objects and advantages will be apparent from the following description of the preferred embodiment of the invention.

DESCRIPTION OF THE PREFERRED EMBODIMENT

The process of producing a rubber-like product from rubber scrap, or from recycled tire rubber, according to the invention, includes mixing rubber scrap with from 1 percent to 15 percent, with respect to the weight of the rubber scrap, of added sulphur, and applying a pressure of about 1000 to 3000 pounds per square inch for 1 to 10 minutes at a temperature of from 250 degrees F to about 450 degrees F.

The above described process is very suitable for making roofing products, such as roll roofing, tiles, shakes, slates, walkway pads, and the like.

The composition that is used in the process preferably includes one of the following two compositions.

| Material | Percentages by Weight (Based on 100 percent) |
|---|---|
| The first composition includes: | |
| (a) recycled tire rubber either in the form of buffings ground into a powder form, or ground and devulcanized, | 80-99% |
| (b) Sulphur, and | 1-12% |
| (c) Antioxidants and antiozonants | 0-8% |
| The second composition includes: | |
| (a) recycled tire rubber, as described above, | 68-99% |
| (b) Sulfasan R, | 1-8% |
| (c) Santocure NS, | 0-8% |
| (d) Thiurad, and | 0-8% |
| (e) Antioxidants and antiozonants | 0-8% |

It is noted that Sulfasan R and Santocure NS and Thiurad are trademarks of the Monsanto Company, St. Louis, Mo. These three products are derivatives sulphur compounds and are termed vulcanizing agents.

The process conditions that give the best results, and which are preferred, include:

a) For buffings of tire rubber, the temperature is 340 degrees F., the time is 10 minutes, and the pressure is 1700 pounds per square inch.

b) For powdered tire rubber, the temperature is 380 degrees F., the time is 1 minute, and the pressure is 1700 pounds per square inch.

The process machinery for large scale production according to the invention includes a heavy duty mixer of conventional design for mixing the rubber scrap with the sulphur. The process machinery also includes a special purpose compression molding machine, for compression molding of the product. A calendar roll mill, which has two heavy duty rollers separated by a gap thickness, is used as a compression molding machine for making a roll roofing sheet. A hydraulic compressor having a mold is used as a compression molding machine for making a shake having a patterned surface.

The following examples are given by way of illustration and in no way limit the invention.

EXAMPLE 1

The following samples were tested, and the physical testing results are listed in Table 1 below. In these samples, the composition, which is the same for each sample, is 100 parts of TP-40, which is a recycled tire rubber powder, and 4 parts of sulphur. The pressure, which is the same for each sample, is 1700 pounds per square inch. The samples are tested at different temperatures and are tested at different lengths of time, as shown in Table 1 under Sample. The pressure of 1700 pounds per square inch is based upon a 30 ton load on a 35 square inch area of a 5 inch by 7 inch test mold.

TABLE 1

| TESTING RESULTS OF SAMPLES AT 4 PHR SULPHUR | | | | | |
|---|---|---|---|---|---|
| No. | Temp. degrees F. | Time Min. | Tensile Strength at Break (PSI) | Percent Elongation (%) | Tear Resistance lbs./in. |
| 1 | 340 | 5 | 490 | 96 | 135 |
| 2 | 340 | 10 | 1113 | 149 | 131 |
| 3 | 340 | 30 | 1114 | 130 | 118 |
| 4 | 360 | 1 | 677 | 167 | 113 |
| 5 | 360 | 5 | 1082 | 149 | 135 |
| 6 | 360 | 10 | 1077 | 131 | 121 |
| 7 | 360 | 30 | 1019 | 120 | 117 |
| 8 | 380 | 1 | 990 | 134 | 129 |
| 9 | 380 | 5 | 957 | 130 | 124 |

TABLE 1-continued

TESTING RESULTS OF SAMPLES AT 4 PHR SULPHUR

| No. | Temp. degrees F. | Time Min. | Tensile Strength at Break (PSI) | Percent Elongation (%) | Tear Resistance lbs./in. |
|---|---|---|---|---|---|
| 10 | 380 | 10 | 1000 | 138 | 133 |
| 11 | 380 | 30 | 895 | 117 | 113 |

EXAMPLE 2

The folowing samples were tested, and the physical testing results are listed is Table 2 below. In these samples, the compositions, which is the same for each such sample, is 100 parts of TP-40, which is a recycled tire rubber powder, and two parts of sulphur. The pressure, which is the same for each such sample is 1700 pounds per square inch. The samples are tested at different temperatures and are tested at different lengths of time, as shown in Table 2 under sample.

TABLE 2

TESTING RESULTS OF SAMPLES AT 2 PHR SULPHUR

| No. | Temp. degree F. | Time Min. | Tensile Strength at Break (PSI) | Percent Elongation (%) | Tear Resistance lbs/in. |
|---|---|---|---|---|---|
| 1 | 340 | 5 | 888 | 178 | 128 |
| 2 | 840 | 10 | 974 | 179 | 129 |
| 3 | 360 | 5 | 950 | 184 | |
| 4 | 360 | 10 | 880 | 173 | |
| 5 | 380 | 1 | 830 | 182 | 122 |
| 6 | 380 | 5 | 831 | 180 | 112 |
| 7 | 380 | 10 | 781 | 172 | 119 |

EXAMPLE 3

The following samples were tested, and the physical tests results are listed in Table 3 below. The compositions of the samples varied as listed in Table 3 under samples. The pressure, which is the same for each sample, is 1700 pounds per square inch. The temperatures and lengths of time varied as listed in Table 3 under samples. Each sample was tested originally when made, as listed as Original under tensile strength and percent strain and tear strength. Each sample was then aged 532 hours (Xenon arc Weatherometer), and again tested as listed in brackets under tensile strength and percent strain and tear strength. In 1 through 6, 100 parts of each scrap rubber noted was mixed with 2 PHR Sulphur. In samples 7 and 8, composition A included 100 parts of TP-40 plus 1 PHR Sulfasan R plus 1 PHR Santocure NS plus 1 PHR Thiurad. In sample 9, composition B included 100 parts of TP-40 with 2 PHR Sulphur plus 1.5 PHR Agerite Stalite ® plus 1.5 PHR Antozite ®. In samples 11 and 11, composition C included 100 parts of TP-40 plus 1 PHR Sulfasan R plus 1 PHR Santocure NS plus 1 PHR Thiurad plus 1.5 PHR Agerite and 1.5 PHR Antiozonite. Sulfasan R and Santocure NS and Thiurad are trademarks of the Monsanto Company, St. Louis, Mo. for derivative sulphur compounds. TP-40 ® is a scrap rubber in powder form supplied by Baker Rubber Inc., South Bend, Ind. Agerite Stalite ® and Antosite ® are supplied by R. T. Vanderbilt Co., Inc., Norwalk, Conn.

TABLE 3

TESTING RESULTS OF SAMPLES

| Sample Composition | Temp. F. | Time Min. | Tensile Strength (PSI) | | % Strain | | Tear Strength (PSI) | |
|---|---|---|---|---|---|---|---|---|
| | | | Orig. | Aged 532 hrs | Orig. | Aged 532 hrs | Orig. | Aged 532 hrs |
| (1) 100% Buffing + 2PHR S. | 380 | 1 | 332 | (351) | 70 | (51) | 286 | (202) |
| (2) 50%/50% Buffings/TP-40 + 2PHR S. | 380 | 1 | 540 | (465) | 107 | (60) | 245 | (229) |
| (3) 100% TP-40 + 2PHR S. | 380 | 1 | 845 | (459) | 173 | (77) | 247 | (200) |
| (4) 100% Buffings + 2PHR S. | 340 | 10 | 934 | (922) | 162 | (106) | 277 | (208) |
| (5) 50%/50% Buffings/TP-40 + 2PHR S. | 340 | 10 | 789 | (760) | 134 | (85) | 292 | (220) |
| (6) 100% TP-40 + 2PHR S. | 340 | 10 | 516 | (571) | 97 | (61) | 277 | (220) |
| (7) Composition A above | 340 | 10 | 862 | (741) | 99 | (74) | 204 | (182) |
| (8) Comp. A above | 380 | 1 | 924 | (745) | 112 | (72) | 252 | (177) |
| (9) Comp. B above | 340 | 10 | 868 | (972) | 112 | (111) | 261 | (240) |
| (10) Comp. C above | 340 | 10 | 875 | (842) | 115 | (97) | 201 | (201) |
| (11) Comp. C above | 340 | 10 | 927 | (717) | 174 | (87) | 215 | (194) |

EXAMPLE 4

The following samples were tested, and the physical testing results are listed in Table 4 below. The compositions, or formulations, of the samples vary. The samples include samples A, B, C, and D, which are indicated hereafter. For each sample, the temperature is 340 degrees F., the time is ten minutes, and the pressure is about 1700 pounds per square inch, based on 30 tons on 35 square inches of a test mold of 5 inches by 7 inches. The samples and respective formulations are as follows:

| SAMPLE | FORMULATION |
|---|---|
| A = | TP-40 + 2 PHR Sulphur |
| B = | TP-40 + 2 PHR-S, 1.5 PHR — Agerite Stalite ®, and 1.5 PHR — Antozite ® |
| C = | TP-40 + 1 PHR Sulfasan ® R, 1 PHR Santocure ® NS, and 1 PHR Thiurad ®. |
| D = | Tp-40 + 1 PHR Suliasan R, 1 PHR Santocure NS, |

-continued

| SAMPLE | FORMULATION |
|---|---|
| | 1 PHR Thiorad, 1.5 PHR Agerite Stalite, and 1.5 PHR Antiozonite |

TABLE 4

TESTING RESULTS OF SAMPLES

| Sample Formulation = | A | B | C | D | I.D. (ice dam) |
|---|---|---|---|---|---|
| Originals | | | | | |
| Tensile strength (PSI) = | 803 | 854 | 866 | 751 | 188 |
| % Elongation = | 152 | 159 | 99 | 110 | 13 |
| Tear strength (PSI) = | 467 | 568 | 464 | 372 | 190 |
| Dimensions Length/Width | | | | | |
| in millimeters = | 171/123 | 171/122 | 170/123 | 170/123 | |
| Avg. Thickness (ins) = | .092 | .089 | .087 | .091 | .040 |
| OVEN AGED 6 WKS @ 176 F. | | | | | |
| Tensile strength (PSI) = | 778 | 833 | 867 | 936 | 240 |
| % Elongation = | 25 | 34 | 62 | 76 | 4 |
| Tear Strength (PSI) = | 286 | 265 | 324 | 403 | 125 |
| % Retention of Tensile Strength/ % Elongation = | 96.9/ 16.4 | 97.5/ 21.4 | 100/ 62.6 | 124.6/ 69.1 | 127.7/ 30.0 |
| % Weight Loss = | 1.46 | 2.17 | 3.37 | 3.68 | |
| Dimensions Length/Width | | | | | |
| in millimeters = | 170/121 | 169/121 | 168/121 | 167/120 | |
| Avg. Thickness (ins) = | .092 | .088 | .091 | .089 | |

The embodiments of an invention in which an exclusive property or right is calimed as defined as follows:

1. A process of making a roofing product, such as roll roofing, tiles, shakes, slates, walkway pads, and the like, including the steps of:
   a. providing a selected weight of rubber scrap;
   b. mixing the selected weight of rubber scrap with from 1 percent by 15 percent with respect to the weight of the rubber scrap of added sulphur to form a mixture;
   c. feeding the mixture into a gap of selective thickness disposed between a pair of compression rotary cylinders to form a continuous roofing product sheet;
   d. applying a pressure from the rollers to the sheet of about 1000 to 3000 pounds per square inch for 1 to 10 minutes while feeding the mixture; and
   e. applying a temperature of from about 250 degrees F. to about 450 degrees F. to the mixture and the sheet while feeding the mixture.

2. The process of claim 1, including:
   mixing with the rubber scrap and the sulphur of from 1 to 8 percent of antioxidants and antiozonants; and wherein the pressure is about 1700 pounds per square inch.

3. The process of claim 1, wherein the rubber scrap includes buffings of recycled tire rubber.

4. The process of claim 1, wherein the rubber scrap includes powder of recycled or devulcanized tire rubber.

5. The process of claim 1, wherein the sulphur includes derivative sulphur compounds.

* * * * *